US009173431B2

(12) United States Patent
Kodali

(10) Patent No.: US 9,173,431 B2
(45) Date of Patent: Nov. 3, 2015

(54) SYSTEM AND METHOD OF DE-STEMMING PRODUCE

(71) Applicant: Nagendra B. Kodali, Pelham, NH (US)

(72) Inventor: Nagendra B. Kodali, Pelham, NH (US)

(*) Notice: Subject to any disclaimer, the term of this patent is extended or adjusted under 35 U.S.C. 154(b) by 181 days.

(21) Appl. No.: 13/758,276

(22) Filed: Feb. 4, 2013

(65) Prior Publication Data
US 2014/0220208 A1    Aug. 7, 2014

(51) Int. Cl.
A23N 15/02    (2006.01)

(52) U.S. Cl.
CPC ..................................... A23N 15/02 (2013.01)

(58) Field of Classification Search
CPC . A23N 15/02; B65G 2201/0211; B65G 15/16
USPC ............... 83/100, 155, 354, 356.3, 420, 422; 100/97; 241/281; 99/640; 426/484
See application file for complete search history.

(56) References Cited

U.S. PATENT DOCUMENTS

| | | | |
|---|---|---|---|
| 2,217,679 A | 10/1940 | Gray et al. | |
| 2,361,834 A | 10/1944 | Frova | |
| 2,486,367 A | 10/1949 | Abrey et al. | |
| 2,731,051 A | 1/1956 | Metcalf et al. | |
| 3,164,182 A | 1/1965 | Hughes et al. | |
| 3,291,036 A | 12/1966 | Perl | |
| 3,389,731 A | 6/1968 | Teigen | |
| 3,396,770 A | 8/1968 | Buchner | |
| 3,508,557 A | 4/1970 | Sunday | |
| 3,734,004 A | 5/1973 | Losito | |
| 3,820,450 A | 6/1974 | Rasmussen et al. | |
| 3,989,110 A * | 11/1976 | Medlock et al. ................ 171/28 |
| 4,237,909 A | 12/1980 | Jenkins et al. | |
| 4,367,675 A | 1/1983 | Boots | |
| 4,382,332 A | 5/1983 | Dominge | |
| 4,430,933 A | 2/1984 | Boots | |
| 4,836,220 A | 6/1989 | Miyake et al. | |
| 4,981,220 A | 1/1991 | Kolodesh et al. | |
| 5,066,507 A | 11/1991 | Miwa et al. | |
| 5,234,375 A | 8/1993 | Hendriks | |
| 5,245,918 A | 9/1993 | Volk, Sr. | |
| 5,341,914 A | 8/1994 | DeMars et al. | |
| 5,824,356 A | 10/1998 | Silver et al. | |

(Continued)

FOREIGN PATENT DOCUMENTS

EP    1 914 183 A1    4/2008
JP    2001-224349    8/2001

OTHER PUBLICATIONS

US Office Action in U.S. Appl. No. 13/548,989 DTD Feb. 11, 2014.

(Continued)

*Primary Examiner* — Jianying Atkisson
(74) *Attorney, Agent, or Firm* — Foley & Lardner LLP; James C. De Vellis

(57) ABSTRACT

Systems and methods of de-stemming produce are provided. An apparatus can process an item of produce having a first portion and a second portion attached to the first portion. The apparatus can include at least one first conveyor unit that can convey the first portion of the item of produce in a first direction. The apparatus can include at least one second conveyor unit that can convey the second portion of the item of produce in a second direction that differs from the first linear direction by between zero and 90 degrees to generate a separation force between the first portion of the item of produce and the second portion of the item of produce that separates the first portion from the second portion.

22 Claims, 9 Drawing Sheets

(56) References Cited

U.S. PATENT DOCUMENTS

| | | | |
|---|---|---|---|
| 5,851,146 | A | 12/1998 | Schloesser |
| 6,237,477 | B1 | 5/2001 | Huddle |
| 6,550,366 | B2 | 4/2003 | Ortega et al. |
| 6,708,694 | B2 | 3/2004 | Dombek |
| 7,810,631 | B2 | 10/2010 | Kawakami |
| 8,311,339 | B2 | 11/2012 | Chu |
| 2005/0185278 | A1 | 8/2005 | Horsten et al. |
| 2005/0206610 | A1 | 9/2005 | Cordelli |
| 2008/0289515 | A1 | 11/2008 | Knorr et al. |
| 2011/0048253 | A1 | 3/2011 | Melandri et al. |
| 2011/0199294 | A1 | 8/2011 | Vilcovsky |
| 2012/0294991 | A1 | 11/2012 | Knorr et al. |
| 2013/0064950 | A1 | 3/2013 | Randazzo |

OTHER PUBLICATIONS

International Search Report and Written Opinion mailed Jul. 18, 2014 in PCT Application No. PCT/US2014/025611.
Moorman, Jane, "NMSU M-TEC engineers developing automated chile destemmer" NMSU News Center, Oct. 10, 2008 (5 pages).
Associated Press, New Mexico Chile Numbers Down for 2013, Mar. 27, 2014.
Funk, P. et al., Pepper Harvest Technology, Peppers: Botany, Production and Uses, Chapter 17, CAB International 2012.
International Search Report and Written Opinion dtd Mar. 16, 2015 for PCT Application No. PCT/US2014/011456.
Moorman, Jane, NMSU engineers developing automated chile destemmer, Southwest Farm Press, Mar. 4, 2009, 3 pages.
New Mexico Chile Association, Breeding Solutions Statement, undated, retrieved from URL: http://www.nmchileassociation.com/id27.html on May 29, 2015.
Offner, Jim, Researchers focus on techniques for harvesting peppers by machine, The Packer, Jul. 7, 2014.
Riggs, Nancy, Chile Mechanization Comes Closer, Growing Magazine, Oct. 1, 2011.
Robbins, Ted, Shortage of Workers hampers Chili Harvest in New Mexico, NPR, Oct. 13, 2013.
Roberts, Scott, Chile Pepper Industry to Increase Production, The Official Scott Roberts Website, 2009.
Soular, Diana Alba, NMSU's new green chile harvester fortells crop's future, Las Cruces News, Sep. 3, 2014.
US Office Action in U.S. Appl. No. 14/153,577 DTD May 19, 2015.
US Office Action in U.S. Appl. No. 14/206,380 DTD Apr. 30, 2015.
US Office Action in U.S. Appl. No. 14/558,287 DTD May 18, 2015.
US Office Action in U.S. Appl. No. 14/591,558 DTD May 19, 2015.
US Office Action in U.S. Appl. No. 13/829,529 dated Mar. 6, 2015.
Walker, S., et al., Mechanizing Chile Peppers: Challenges and Advances in Transitioning Harvest of New Mexico's Signature Crop, HorTechnology, vol. 24, No. 3, Jun. 2014.

\* cited by examiner

SYSTEM AND METHOD OF DE-STEMMING PRODUCE

BACKGROUND

Agricultural products can be harvested manually or with the aid of harvesting machines. When agricultural products are harvested from a field, the agricultural products can be processed and distributed to consumers for consumption.

SUMMARY

At least one aspect is directed to a de-stemming apparatus for de-stemming produce. The produce can have a pod, a stem, and a calyx. The de-stemming apparatus can include a first conveyor unit having a top surface that can convey the pod, and a second conveyor unit having a first portion proximate to the first conveyor unit and can have a second portion disposed at an angle of greater than zero and less than 60 degrees relative to the first conveyor unit. The de-stemming apparatus can include a third conveyor unit that can engage the pod between the top surface of the first conveyor unit and a bottom surface of the third conveyor unit. The de-stemming apparatus can include a fourth conveyor unit that can engage the stem between a top surface of the second conveyor unit and a bottom surface of the fourth conveyor unit. The de-stemming apparatus can include at least one driving unit that can drive at least one of the first conveyor unit, the second conveyor unit, the third conveyor unit, and the fourth conveyor unit to convey the produce from a first point of the de-stemming apparatus to a second point of the de-stemming apparatus. The at least one driving unit can generate a separation force between the pod and the stem that separates at least a portion of the stem and at least a portion of the calyx from the pod during conveyance of the produce between the first point and the second point.

At least one aspect is directed to an apparatus for processing an item of produce having a first portion and a second portion attached to the first portion. The apparatus can include at least one first conveyor unit that can convey the first portion of the item of produce in a first linear direction. The apparatus can include at least one second conveyor unit that can convey the second portion of the item of produce in a second linear direction that differs from the first linear direction by between 0.5 and 30 degrees to generate a separation force between the first portion of the item of produce and the second portion of the item of produce that separates the first portion from the second portion.

At least one aspect is directed to an apparatus for processing produce. The apparatus can include means for conveying produce having a pod and a stem from a first point to a second point at a constant speed with the pod fixed in a first trajectory and the stem fixed in a second trajectory that deviates from the first trajectory by an angle greater than zero and less than 45 degrees to generate a separation force between the pod and the stem that separates at least a portion of the stem from the pod during conveyance from the first point through the second point.

At least one aspect is directed to a method of processing produce. The method can convey an item of produce having a pod and a stem through a de-stemming apparatus at a constant speed from a first point to a second point with the pod fixed in a first trajectory and the stem fixed in a second trajectory that deviates from the first trajectory by an angle greater than zero and less than 45 degrees. The method can generate a separation force between the stem and the pod that separates at least a portion of the stem from the pod between the first point and the second point.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for processing produce. The various concepts introduced above and discussed in greater detail below may be implemented in any of numerous ways, as the described concepts are not limited to any particular manner of implementation. Examples of specific implementations and applications are provided primarily for illustrative purposes.

Agricultural products, e.g., produce such as fruits or vegetables, can be harvested from farms. The produce can be harvested or picked by farmers manually, with the use of harvesting machines, or using combinations thereof. When the produce is harvested, the edible portion of the produce can be picked from a plant together with additional portions of the plant that are generally not eaten. For example, a pepper having a pod (generally eaten) and a stem (generally not eaten) can be removed from a pepper plant with at least a portion of the stem still attached to the pod.

A de-stemming apparatus can separate the stem and other portions of the produce that are generally not eaten from the body or pod of the produce that is generally eaten. For example, de-stemming apparatus can include at least one conveyor unit. The produce can be placed on at least one conveyor unit to travel from a first point to a second point of the de-stemming apparatus. During this travel the pod of the produce can be held in a first fixed position and conveyed along a first trajectory, and the stem (or other portion of the produce) can be held in a second fixed position and conveyed along a second trajectory. Divergence between the first and second trajectories (e.g., by between zero and 90 degrees) with the pod held in the first position and the stem held in the second position can generate a separation force during conveyance between the first and second points of the de-stemming apparatus. The separation force can pull at least the stem of the produce apart from the pod of the produce and can remove at least a portion of the stem from the pod of the produce.

Figure 1:
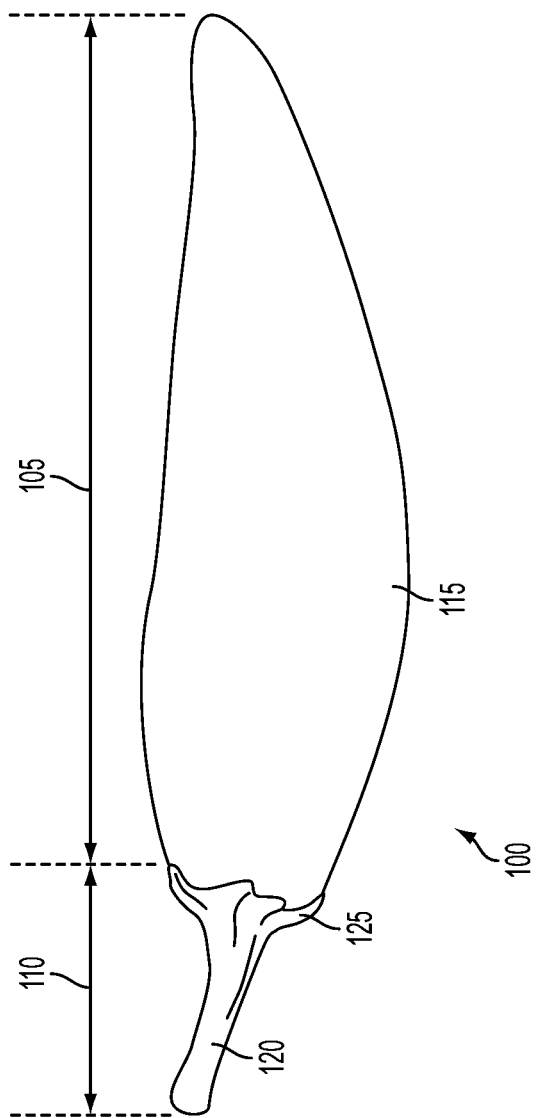
FIG. 1 is an illustration depicting one example of an item of produce, according to an illustrative implementation.

FIG. 1 illustrates an example of an item of produce 100. As illustrated in the example of FIG. 1, the produce 100 is a pepper, although the produce 100 can be other agricultural products such as fruits, vegetables, tomatoes, lemons, citrus, olives, carrots, eggplant, cucumbers, zucchini, squash, melons, peas, beans, legumes, tubers, onions, radishes, beats, strawberries, bananas, corn, apples, pears, peaches, plums grapes, lettuce, celery, or mushrooms for example. The produce 100 can generally include a commercial crop or agricultural product harvested for human consumption.

The produce 100 can include a first portion 105 and a second portion 110. The first portion 105 can include a body or pod 115 of the produce 100, and the second portion 110 can include at least a portion of the stem 120 or the calyx 125 of the produce 100, with the pod 115 generally being the edible portion of the produce 100. The stem 120 and the calyx 125 (while perhaps being edible) are generally the portions of the produce 100 that are not eaten. For example, the stem 120 can include the portion of the produce 100 that at least partially supports the produce 100, and the calyx 125 can include sepals or other structure between the outer surface of the pod 115 and the stem 120. The calyx 125 can include a cup shaped structure that attaches the stem 120 with the pod 115 or that covers at least a portion of the pod 115.

Figure 2:
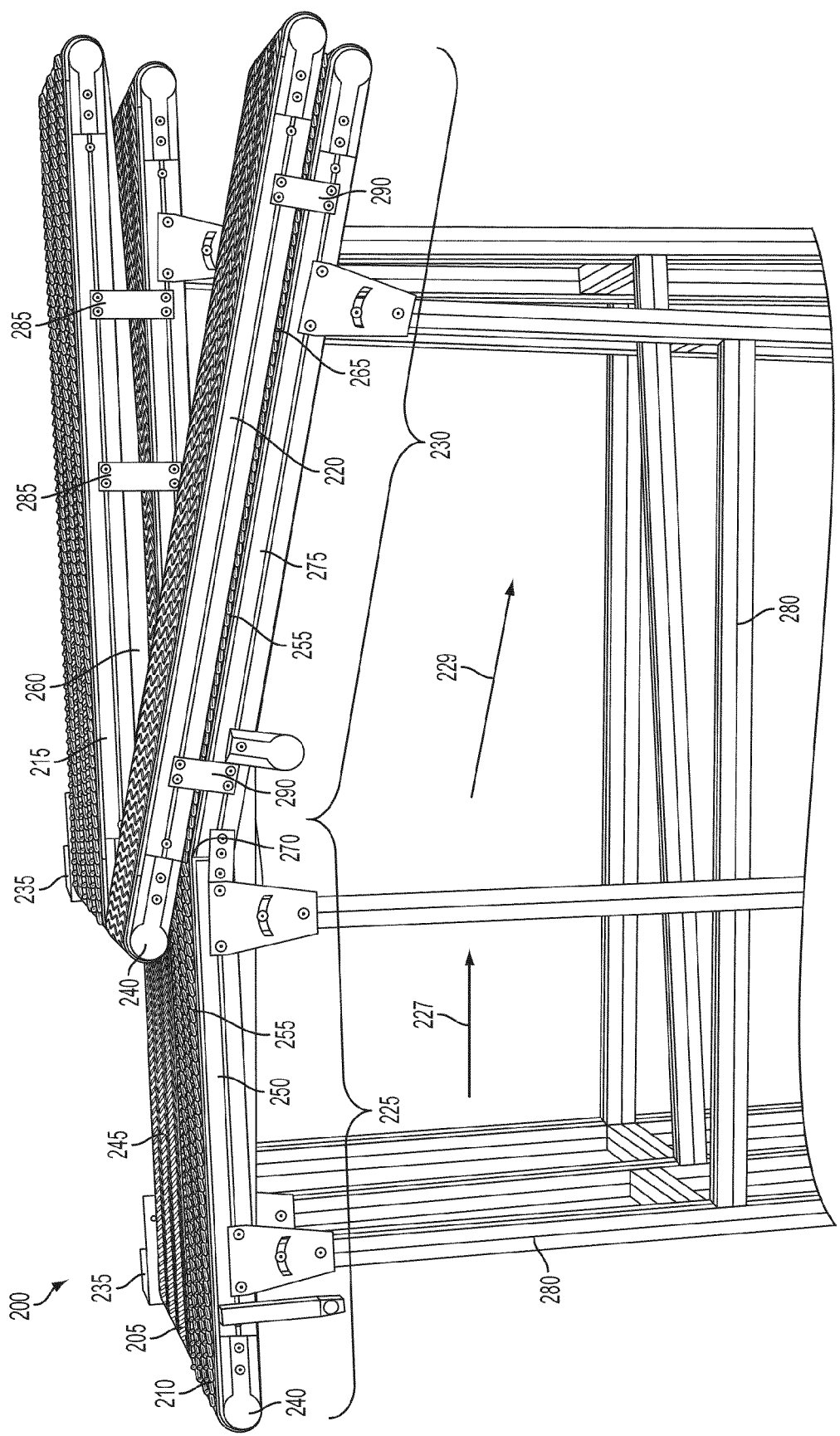
FIG. 2 is a perspective view depicting one example of a de-stemming apparatus, according to an illustrative implementation.

FIG. 2 illustrates one example of a de-stemming apparatus 200. The de-stemming apparatus 200 can separate the first portion 105 of the produce 100 from the second portion 110 of the produce 100. For example, de-stemming apparatus 200 can process the produce 100 to separate at least part of the stem 120 or the calyx 125 from the pod 115.

In some implementations, the de-stemming apparatus 200 includes at least one conveyor unit. For example, the de-stemming apparatus 200 can include at least one first conveyor unit 205, at least one second conveyor unit 210, at least one third conveyor unit 215, and at least one fourth conveyor unit 220, each of which can include at least one conveyor belt or cleated chain to accommodate the produce 100. For example, the first to fourth conveyor units 205 to 220 can include conveyor belts having grooves, dimples, divots, recesses, smooth surfaces, cleated surfaces, chains, ridges, treads, protrusions, or frictional elements that contact the produce 100 to convey the produce 100 (e.g., from left to right in directions of motion 227 or 229 as depicted in FIG. 2) from a first point within range 225 to a second point within range 230.

In some implementations, at least one driving unit 235 is configured to drive the first to fourth conveyor units 205 to 220. The driving units 235 can include at least one motor coupled to at least one shaft 240 connected to at least one of the first to fourth conveyor units 205 to 220. The driving units 235 can rotate the shafts 240 to drive the respective conveyor belts around the first to fourth conveyor units 205 to 220.

In one implementation, a first driving unit 235 and a first shaft 240 are coupled to the first conveyor unit 205 and the second conveyor unit 210 to drive the first conveyor unit 205 and the second conveyor unit 210. For example, the driving unit 235 and the shaft 240 can drive the first and second conveyor units 205 and 210 at a constant (e.g., +/−10%) speed. In some implementations, a second driving unit 235 and a second shaft 240 are coupled to the third conveyor unit 215 and the fourth conveyor unit 220 to drive the third conveyor unit 215 and the fourth conveyor unit 220, for example at a constant (e.g., +/−10%) speed.

In one implementation, at least one driving unit 235 operates the conveyor units (e.g., first to fourth conveyor units 205 to 220) at a same speed (e.g., within +/−10%). For example, the driving unit 235 can include an AC or DC motor to drive the first to fourth conveyor units 205 to 220 at a speed of between 0.1 and 10 feet per second. In some implementations, one driving unit 235 can drive one or more of conveyor units 205 to 220, or the conveyor units 205 to 220 can have dedicated driving units 235 that may communicate with each other for speed control, or that can be independently operated.

The de-stemming apparatus 200 can convey the produce 100 such as a pepper along a length of the de-stemming apparatus 200. In some implementations, the first conveyor unit 205 is disposed proximate to a first portion 250 of the second conveyor unit 210. For example, the first conveyor unit 205 and the first portion 250 of the second conveyor unit 210 can be coplanar. In some implementations, a top surface 245 of the first conveyor 205 unit and a top surface 255 of the first portion 250 of the second conveyor unit 210 are disposed proximate to each other so that the top surface 245 and the top surface 255 are substantially level.

In one implementation, the produce 100 is disposed with at least a portion of the pod 115 (or first portion 105) contacting the top surface 245 of the first conveyor unit 205 and at least a portion of the stem 120 (or second portion 110) contacting or disposed above the top surface 255 of the second conveyor unit 210. In this example, the produce 100 overlaps both the top surface 245 of the first conveyor unit 205 and the proximate top surface 255 of the first portion 250 of the second conveyor unit 210. At least one driving unit 235 can drive the first conveyor unit 205 and the second conveyor unit 210 (e.g., at a same speed) to convey the produce 100 in the direction of motion 227 along the first conveyor unit 205 and the first portion 250 of the second conveyor unit 210. In this example, the second portion 110 of the produce 100 (e.g., the stem 120 or the calyx 125) may or may not contact the second conveyor unit 210. For example, the second portion of 110 of the produce 100 may be disposed above the top surface 255 without contacting the top surface 255, with the pod 115 or first portion 105 resting on the top surface 245 of the first conveyor unit 205.

A manual operator, produce feeder apparatus, or produce alignment apparatus (not shown in FIG. 2) can provide the produce 100 for entry into the de-stemming apparatus 200, e.g. onto the first conveyor unit 205 or the second conveyor unit 210. For example, an alignment apparatus proximate to or coupled with the de-stemming apparatus 200 can include a conveyor belt system with image recognition features to align peppers or other produce for placement into the de-stemming apparatus 200 with the first portion 105 of the produce 100 disposed on the first conveyor unit 205 and with the second portion 110 of the produce 100 disposed beyond a longitudinal edge of the first conveyor unit 205, (e.g., on or over the second conveyor unit 210). The produce 100 aligned in this manner can be conveyed by the de-stemming apparatus 200 in the direction of motion 227 passing the first point within the range 225, which may be a location or point of the de-stemming apparatus 200 that includes the first portion 250 of the second conveyor unit 210 or a corresponding proximate portion of the first conveyor unit 205.

In some implementations, the de-stemming apparatus 200 conveys the produce 100 in the direction of motion 227, and at least one third conveyor unit 215 or at least one fourth conveyor unit 220 engage at least part of the produce 100. The third conveyor unit 215 and the fourth conveyor unit 220 can operate in a direction consistent with a direction of operation of the first conveyor unit 205 and the second conveyor unit 210. For example, the top surface 245 of the first conveyor unit 205 and the top surface 255 of the second conveyor unit 210 can move in the direction of motion 227 or the direction of motion 229, and a bottom surface 260 of the third conveyor unit 215 and a bottom surface 265 of the fourth conveyor unit 220 can also move in the direction of motion (or trajectory) 227 or the direction of motion (or trajectory) 229, under the control of one or more driving units 235. In this example, from the perspective of FIG. 2, the first conveyor unit 205 and the second conveyor unit 210 can operate at one speed and rotate in a clockwise direction, and the third conveyor unit 215 and the fourth conveyor unit 220 can operate at the same speed as the first and second conveyor units 205 to 210 but can rotate in a counterclockwise direction.

In some implementations, the bottom surface 260 of the third conveyor unit 215 and the top surface 245 of the first conveyor unit 205 engage a first portion 105 of the produce 100 in an opening defined between the bottom surface 260 and the top surface 245. For example, the first conveyor unit 205 and the third conveyor unit 215 can convey the pod 115 in the direction of motion 227. In this example, contact or compression force between the first conveyor unit 205 and the third conveyor unit 215 can hold the pod 115 in a fixed position as the produce 100 is conveyed in a trajectory along a longitudinal length of the de-stemming apparatus 100 in a space defined between the third conveyor unit 215 and the first conveyor unit 205. In this example, the pod 115 (or other first portion 105) of the produce 100 can be pinched or fixed in position between the first conveyor unit 205 and the third conveyor unit 215 with compression force sufficient to hold the pod 115 in a fixed position during conveyance from the first point of the de-stemming apparatus 200 (a location within the range of first points 225) through a second point of the de-stemming apparatus 200 (a location within the range of second points 230).

In some implementations, the second conveyor unit 210 and the fourth conveyor unit 220 can engage the second portion 110 of the produce 100. For example, the bottom surface 265 of the fourth conveyor unit 220 and the top surface 255 of the second conveyor unit 210 can engage at least part of the stem 120 and compression force from the engagement applied to the stem 120 holds the stem 120 in a fixed position during conveyance in the direction of motion 229 in a space defined between the bottom surface 265 and the top surface 255. In one implementation, the point of engagement of the pod 115 with the first conveyor unit 205 and the third conveyor unit 215 occurs at a point of the de-stemming apparatus 200 within the range 225 or at a pivot point 270. The point of engagement of the stem 120 with the second conveyor unit 210 and the fourth conveyor unit 220 can also occur at a point of the de-stemming apparatus 200 within the range 225 or at the pivot point 270.

In some implementations, the de-stemming apparatus 200 engages two different portions of one item of produce 100, such as a pepper. For example, the first conveyor unit 205 together with the third conveyor unit 215 can engage the first portion 105 (e.g., the pod 115) of the item of produce 100, and the second conveyor unit 210 together with the fourth conveyor unit 220 can engage the second portion 110 (e.g., the stem 120) of the item of produce. In one implementation, the two engagements occur substantially simultaneously. For example, the de-stemming apparatus 200 can engage the first portion 105 and second portion 110 of the item of produce 100 within a distance of three inches or less of conveyance in the direction of motion 227, direction of motion 229, or a combination of both directions of motion 227, 229. In some implementations, the de-stemming apparatus 200 engages the pod 115 (or first portion 105 of the produce 100) and the stem 120 (or the second portion 110) sequentially, (e.g., with the pod 115 engaged first, and with the stem subsequently engaged after three or more inches of produce conveyance in the direction of motion 227, direction of motion 229, or a combination thereof. The directions of motion 227 and the direction of motion 229 can be linear directions of motion.

In some implementations, the de-stemming apparatus 200 conveys the first portion 105 of the item of produce 100 along a first trajectory in a first direction, such as the direction of motion 227, and conveys the second portion 110 of the same item of produce 100 along a second trajectory in a second direction, such as the direction of motion 229. The two trajectories can differ with respect to each other by between zero and 90 degrees.

For example, first conveyor unit 205 can convey an item of produce 100 toward the third conveyor unit 215 in the direction of motion 227. This can bring the first portion 105 of the produce 100 (e.g., the pod 115) into contact with the third conveyor unit 215. The first portion 105 continues conveyance into the space or opening between the top surface 245 of the first conveyor unit 205 and the bottom surface 260 of the third conveyor unit 215. This conveyance applies a compression force to the first portion 105 of the produce 100 sufficient to hold the first portion 105 in a fixed position in the direction of motion 227. In some implementations, with the first portion 105 of the produce 100 held in position between the first conveyor unit 205 and the third conveyor unit 215, at least one driving unit 235 continues to move the conveyor units 205, 215 to convey the first portion in the direction of motion 227.

Continuing with this example, the first portion 250 of the second conveyor unit 210 can convey or travel with the same item of produce 100 toward the fourth conveyor unit 220 in the direction of motion 227. The second portion 110 of the produce 100 (e.g., the stem 120) is brought into contact with the fourth conveyor unit 220. The second portion 110 continues conveyance into the space or opening between the top surface 255 of the second conveyor unit 210 and the bottom surface 265 of the fourth conveyor unit 220. This conveyance applies a compression force to the second portion 110 of the produce 100 sufficient to hold the second portion 110 in a fixed position in the direction of motion 229.

In one implementation, the second portion 110 of the produce 100 (e.g., the stem 120) engages the fourth conveyor unit 220 at or proximate to the pivot point 270 between the first portion 250 and a second portion 275 of the second conveyor unit 210. The pivot point 270 can define an angle from greater than zero to 90 degrees between the first portion 250 of the second conveyor unit 210 (or the first conveyor unit 205) and the second portion 275 of the second conveyor unit 210.

Thus, different portions of the de-stemming apparatus 200 can engage different portions of the produce 100 and can convey the different portions of the produce along different trajectories that diverge from each other. In some implementations, the divergence creates a separation force between the first portion 105 and the second portion 110 of the produce 100. For example, the first conveyor unit 205 and the third conveyor unit 215 can engage the pod 115 in the opening between these two conveyor units 205, 215 with compression force that holds the pod 115 in a fixed position (without substantially puncturing, tearing, or disfiguring the pod 115) while conveying the pod 115 along the trajectory of the direction of motion 227. In one implementation, the size of the opening substantially matches (e.g., is the same to 10% less than) the maximum diameter of the pod 115, e.g., less than three inches, or less than two inches for example.

The second conveyor unit 210 and the fourth conveyor unit 220 can engage the stem 120 of the same item of produce 100 in the opening between these two conveyor units 210, 220 with compression force that holds the stem 120 in a fixed position while conveying the stem along the trajectory of the direction of motion 229. In one implementation, the size of the opening substantially matches (e.g., is the same to 10% less than) the maximum diameter of the stem 120, e.g., less than 0.25 inches for example. In one implementation, the stem 120 (or other second portion 110) is pinched between the second conveyor unit 210 and the fourth conveyor unit 220 so that, for example, the conveyor belts of the conveyor units 210, 220 contact each other on lateral sides of the stem 120 such as before and after the area where the stem 120 is disposed, or between consecutive stems 120.

In some implementations, conveyance by the de-stemming apparatus 200 of the produce 100 along these diverging trajectories creates a separation force that separates the first portion 105 of the item of produce 100 from the second portion 110 of the same item of produce. For example, the second portion 275 of the second conveyor unit 210 can be disposed at an angle of between zero and 60 degrees relative to the first conveyor unit 205, or relative to the first portion 250 of the second conveyor unit 210, so that the divergence between trajectories is between zero and 60 degrees in this example.

The separation force generated by conveying different portions of the produce 100 along different trajectories can pull or peel the produce 100 apart between the first portion 105 and the second portion 110. For example, due to the separation force, the de-stemming apparatus 200 can peel at least a portion of the stem 120 or the calyx 125 from the pod 115. In this example, the stem 120 and the calyx 125 can remain attached to each other and be separated from the pod 115, with the pod 115 intact (e.g., without cut, puncture, or rupture wounds that penetrate into the item of produce 100 or into any internal cavities of the produce 100). In this example, it is the separation force, and not a cutting blade, water jet, air blade (e.g., concentrated air flow), or separation obstacle (e.g., a post, wall, or blocker) that is responsible that separates the first portion 105 from the second portion 110.

Once separated, the first portion 105 of the item of produce 100 can remain held in position between the first and third conveyor units 205 and 215 during continued conveyance of the first portion 105 in the direction of motion 227, and the second portion 110 of the produce 100 can remain held in position between the second and fourth conveyor units 210 and 220 during continued conveyance of the second portion 110 in the direction of motion 229 until the first portion 105 and the second portion 110 are expelled or released from the de-stemming apparatus 200, further conveyed, or deposited into one or more receptacles for further processing, transport, quality control, disposal, or recycling.

The separation of the first portion 105 and the second portion 110 of the item of produce 100 can occur between two points of the de-stemming apparatus 200. For example, the first point of the de-stemming apparatus 220 can be a point during which both the first portion 105 and the second portion 110 are conveyed in the direction of motion 227. At this point, the item of produce 100 includes both first portion 105 and the second portion 110, which are attached to each other. For example, the stem 120 and the calyx 125 are attached to the pod 115 of the pepper 100. In one implementation, the first point is a point along the range 225 of the de-stemming apparatus 200, a point of the de-stemming apparatus 200 that includes the first portion 250 of the second conveyor unit 210, or a point at or proximate to the pivot point 270.

Continuing with this example, the second point of the de-stemming apparatus 200 can be a point by which the first portion 105 and the second portion 110 are separated from each other. In one example, at the second point, the first portion 105 (e.g., the pod 115) is conveyed in the direction of motion 227, and the second portion 110 (e.g., the stem 120 and the calyx 125) are conveyed in the direction of motion 229. The separation of the first portion 105 from the second portion 110 can occur or be completed at or prior to conveyance past the second point of the de-stemming apparatus 200. In one implementation, the second point is a point along the range 230 of the de-stemming apparatus 200, or a point of the de-stemming apparatus 200 that includes the second portion 275 of the second conveyor unit 210. In some implementations, the first point is within the range 225 and the second point is within the range 230.

In some implementations, the de-stemming apparatus 200 includes at least one mounting structure 280. The mounting structure 280 can include a plurality of legs, beams, tables, platforms, or support members connected to or configured to support at least one of the conveyor units 205 to 220.

The conveyor units 205 to 220 can have various dimensions. In some implementations, the first conveyor unit 205 is 10 inches or less in width, and 24 inches or longer in length. In one implementation, the second conveyor unit 210 is 6 inches or less in width, the first portion 250 is at least 12 inches in length and the second portion 275 is also at least 12 inches in length. The first and second conveyor units 205, 210 can also be several feet in length, or longer depending for example on whether or not the de-stemming apparatus 200 is fixed or portable, or constructed for low or high volume produce processing. In some implementations, the third conveyor unit 215 is substantially the same width (e.g., +/10%) and shorter in length that the first conveyor unit 205, and the fourth conveyor unit 220 is substantially the same width (e.g., +/10%) and shorter in length that the second conveyor unit 210. In one implementation, the fourth conveyor unit 220 is less than half of the length of the second conveyor unit 210. The third conveyor unit 215 can also be less than half the length of the first conveyor unit 205.

In some implementations, at least one bracket or connecting member 285 couples the first conveyor unit 205 with the third conveyor unit 215. For example, at least one connecting member 285 can fix the third conveyor unit 215 in position above (from the perspective of FIG. 2) at least a portion of the first conveyor unit 205. In this example, the connecting members 285 position the bottom surface 260 of the third conveyor unit 215 parallel to the top surface 245 of the first conveyor unit 205 with an opening (e.g. for the pod 115) between the bottom surface 260 and the top surface 245. In one implementation this opening is less than three inches.

The de-stemming apparatus 200 can also include at least one bracket or connecting member 290 to couple the second conveyor unit 210 with the fourth conveyor unit 220. For example, at least one connecting member 290 can fix the fourth conveyor unit 220 in position above (from the perspective of FIG. 2) at least a portion of the second conveyor unit 210. In this example, the connecting members 290 position the bottom surface 265 of the fourth conveyor unit 220 parallel to the top surface 255 of the second portion 275 of the second conveyor unit 210 with an opening (e.g. for the stem 120) between the bottom surface 265 and the top surface 255. In one implementation this opening is less than 0.25 inches.

Figure 3:
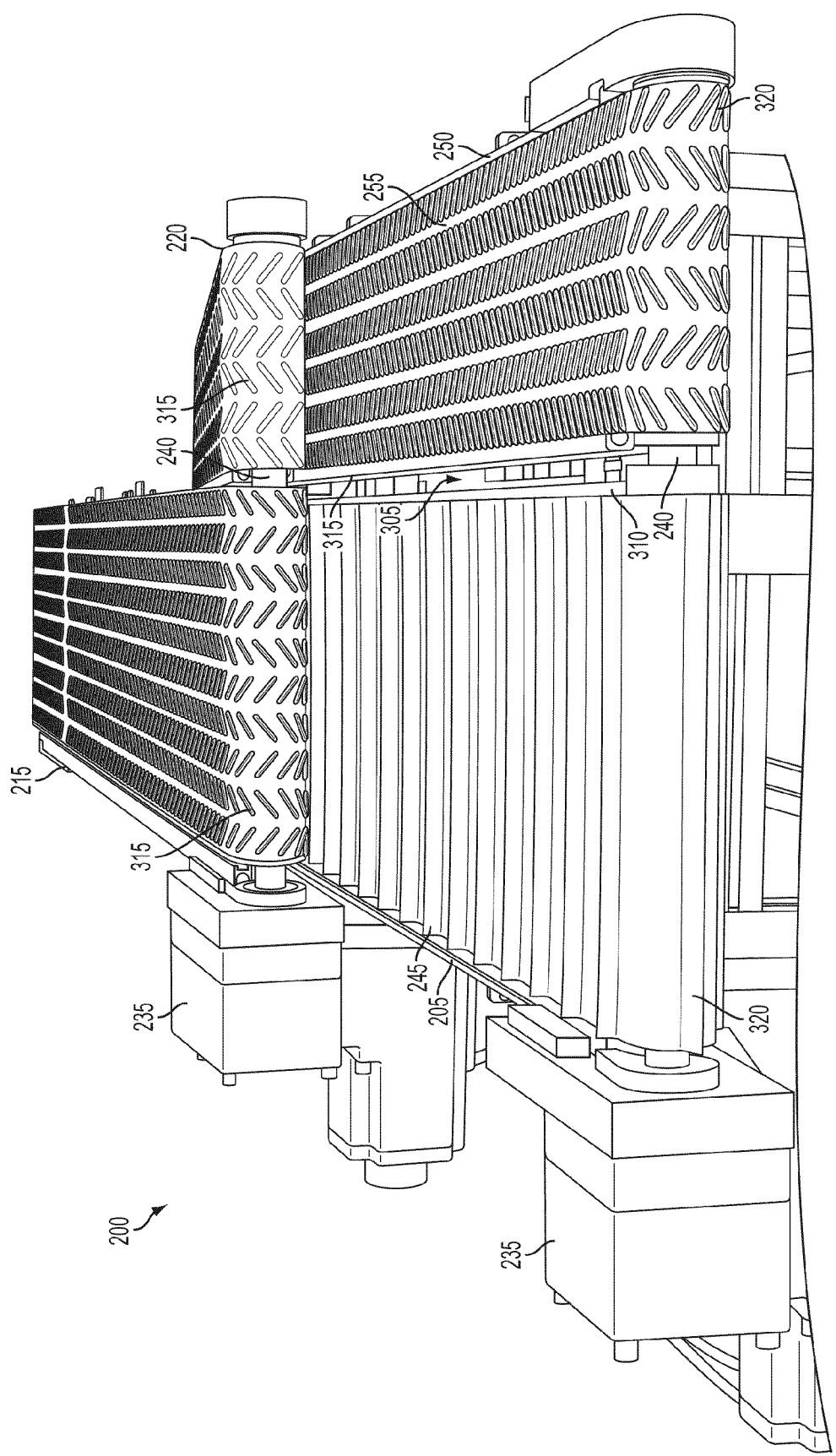
FIG. 3 is a perspective view depicting one example of a de-stemming apparatus, according to an illustrative implementation.
Figure 4:
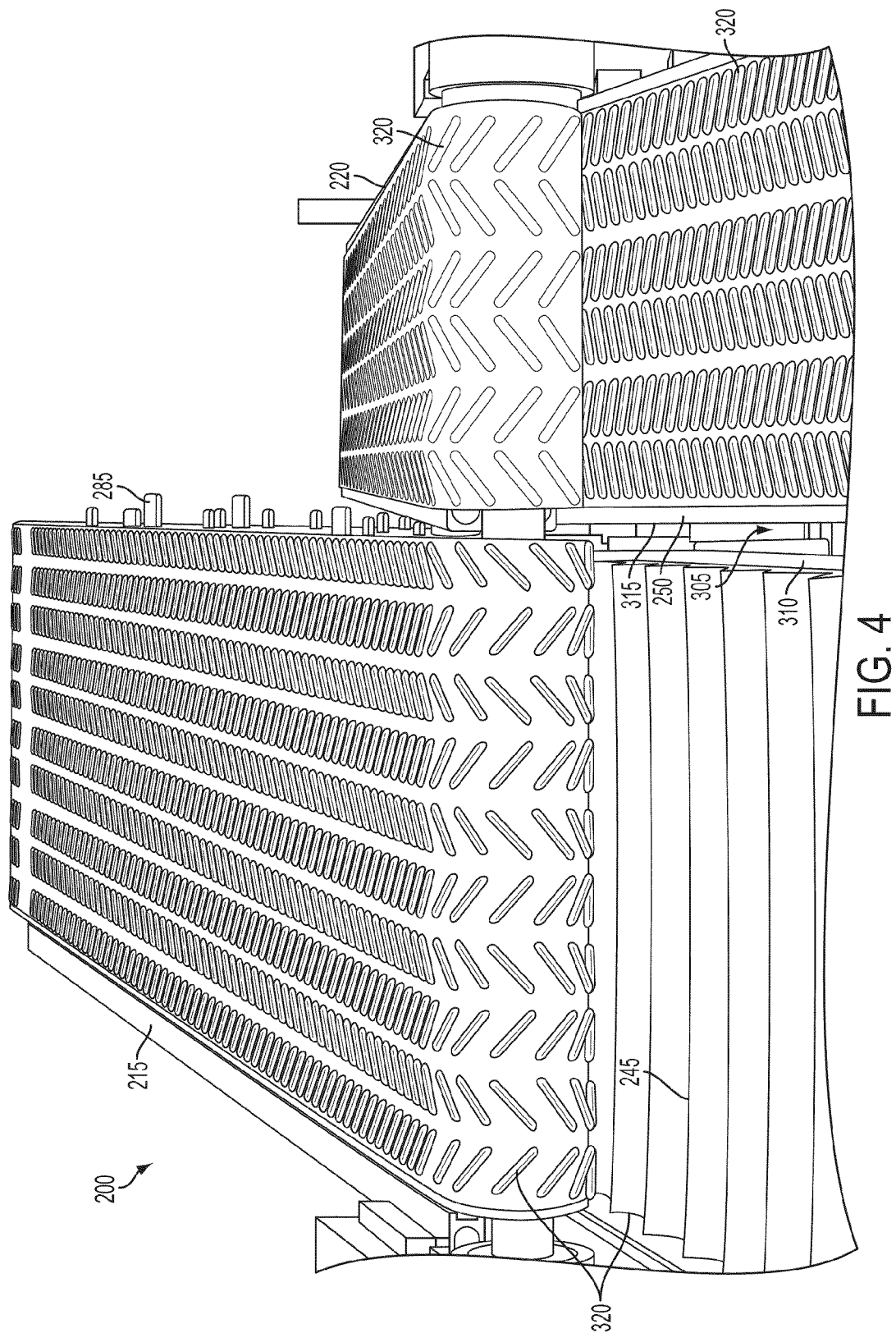
FIG. 4 is a perspective view depicting one example of a de-stemming apparatus, according to an illustrative implementation.

FIG. 3 and FIG. 4 illustrate examples of a de-stemming apparatus 200 from a front longitudinal perspective where the produce 100 (not shown in FIGS. 3 and 4) is fed into the de-stemming apparatus 200 in the foreground, for example with the pod 115 disposed on the top surface 245 of the first conveyor unit 205. In this example, the drive unit 235 that is attached to the first conveyor unit 205 drives the shaft 240 to rotate the first conveyor unit 205 and the second conveyor unit 210. The rotation can carry the produce 100 on the top surface 245 toward the third conveyor unit 215 and the fourth conveyor unit 220.

The de-stemming apparatus 200 can include a gap 305 between the first conveyor unit 205 and the second conveyor unit 210, (the first portion 250 of which is visible in the examples of FIGS. 3 and 4). For example, the gap 305 can include a space defined by an edge 310 of the first conveyor unit 205 and an edge 315 of the second conveyor unit 210. In some implementations, the edge 310 and the edge 315 are proximate edges of their respective conveyor units that define the gap 305 as a substantially parallel opening between the first conveyor unit 205 and the second conveyor unit 210. The conveyor belts of the conveyor units 205 to 220 can extend to, or within 0.25 inches of their respective edges.

Referring to FIGS. 1-4, the gap 305 can have a length (e.g., along the longitudinal axis of the de-stemming apparatus 200) that is substantially the same length as the length of the first portion 250 of the second conveyor unit 210. The width of the gap 305 can define the distance between the first conveyor unit 205 and the adjacent or proximate first portion 250 of the second conveyor unit 210. In some implementations, the width of the gap 305 is between 0.25 and 3 inches. The width of the gap 305 can be less than the length of the second portion 110 of the produce 100 that the de-stemming apparatus 200 processes. In one implementation, the width of the gap 305 is less than the length of the stem 120 of the produce 100.

In some implementations, the produce 100 crosses over the gap 305. For example, all or substantially all of the first portion 105 of the produce 100 can be disposed on the top surface 245 of the first conveyor unit 205, and at least some of the second portion 110 of the produce 100 can be disposed on (e.g., resting on) or above the top surface 255 of the second conveyor unit 210, (e.g., the top surface of the first portion 250 of the second conveyor unit 210). The portion of the produce over the gap 305 can include parts of the pod 115, the stem 120 or the calyx 125 for example. In one implementation, during processing, (e.g., a de-stemming operation performed by the de-stemming apparatus 200) the produce 100 is aligned on the de-stemming apparatus 200 with at least 75% of the first portion 105 on or above the top surface 245 of the first conveyor unit and with at least 10% of the second portion 110 on or above the second conveyor unit 210. The remaining portion of the produce 100 can be disposed over the gap 305 in this example.

Conveyor belts of the first to fourth conveyor units 205 to 220 can include treads 320 on their outer surfaces. For example, the conveyor belt of the first conveyor unit 205 can include treads 320 in the form of spaced apart parallel walls or ridges that protrude out, or upwards, from the conveyor belt to accommodate the produce 100. The treads 320 can include various shapes or patters, such as walls, tread patterns, wave patterns, or serpentine patterns. In one implementations, the treads 320 of the first conveyor unit 205 and the third conveyor unit 215 accommodate the first portion 105 (e.g., the pod 115) of the produce 100, and the treads 320 accommodate the second portion (e.g., including the stem 120) of the produce 100.

In one implementation, the treads 320 of the first conveyor unit 205 have a pattern that is different than the treads 320 of the second conveyor unit 210, the third conveyor unit 215, and the fourth conveyor unit 220. For example, the treads 320 of the first conveyor unit 205 can include a series of parallel walls, where a recess between two successive parallel walls accommodates a single item of produce 100, (e.g., a single pod 115 can be disposed between two consecutive walls). The treads 320 of the second conveyor unit 210, third conveyor unit 215, and fourth conveyor unit 220 can have difference shapes, sizes or patterns. In some implementations, the treads 320 of the first conveyor unit 205 are configured to interact with the treads 320 of the third conveyor unit 215. For example, the treads 320 of the first conveyor unit 205 can include protrusions, and the treads 320 of the third conveyor unit 215 can include depressions or recesses. The treads 320 of the respective conveyor units can align to secure at least a portion of the produce 100 in a fixed position during conveyance through the de-stemming apparatus 200. The treads 320 of the second conveyor unit 210 and the fourth conveyor unit 220 can also align with each other during operation of the de-stemming apparatus 200.

Figure 5:
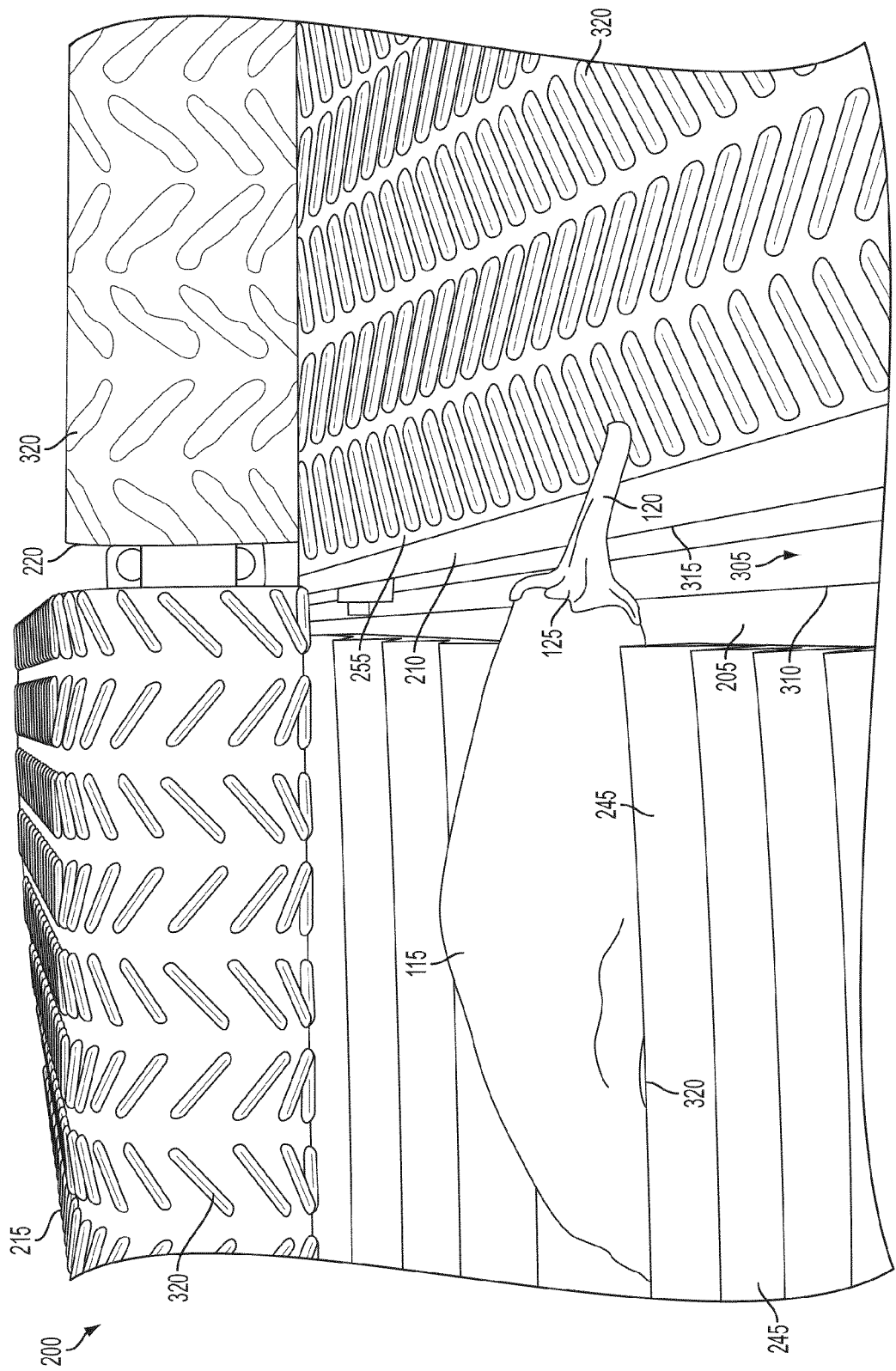
FIG. 5 is a perspective view depicting one example of a de-stemming apparatus, according to an illustrative implementation.

FIG. 5 illustrates one example of a de-stemming apparatus 200 from a front longitudinal perspective where the produce 100 is fed into the de-stemming apparatus 200. In one implementation, the majority of the pod 115 is disposed on the top surface 245, for example between consecutive treads 320, with the calyx 125 generally positioned over the gap 305, and with the stem 120 crossing the gap 305 over the second conveyor unit 210, with at least a portion of the stem 120 on or over the top surface 255 of the second conveyor unit 210. In one implementation, at least the first conveyor unit 205 and the second conveyor unit 210 are in motion to convey the produce 100 toward the third conveyor unit 215 and the fourth conveyor unit 220, which can also be in motion to engage the produce 100 when at least a portion of the produce 100 is brought into contact with the third conveyor unit 215 or the fourth conveyor unit 220.

Figure 6:
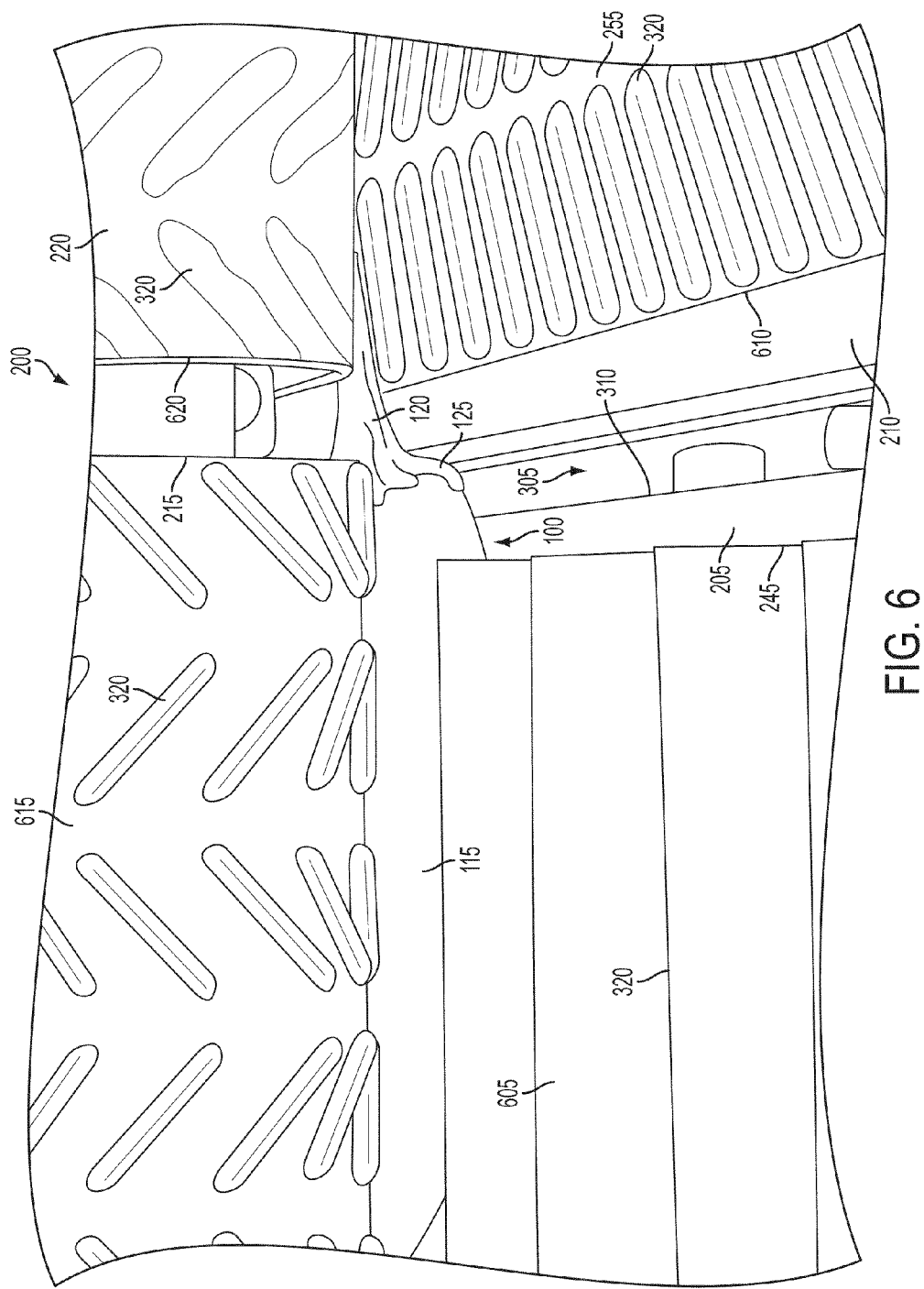
FIG. 6 is a perspective view depicting one example of a de-stemming apparatus, according to an illustrative implementation.

FIG. 6 illustrates one example of a de-stemming apparatus 200 where the produce 100 is fed into the de-stemming apparatus 200. In one implementation, each of the first conveyor unit 205, the second conveyor unit 210, the third conveyor unit 215, and the fourth conveyor unit 220 are in motion (e.g., under the control of at least one driving unit 235) at the same or substantially the same speed (e.g., +/−10%). The speed can range from 0.1 to 10 feet per second, for example.

During operation of the de-stemming apparatus 200 the conveyor belt 605 of the first conveyor unit 205 can carry the produce 100 with the pod 115 disposed on the top surface 245. The third conveyor unit 215 together with the first conveyor unit 205 can engage part of the produce 100, such as the pod 115, and the fourth conveyor unit 220 can engage a different part of the produce 100, such as the stem 120. In this example and referring to FIGS. 1-6, with the four conveyor units in motion, the first conveyor unit 205 and the third conveyor unit 215 can hold at least a portion of the pod 115 (or other first portion 105) of an item of produce) generally fixed in position (e.g., during conveyance in the direction of motion 227). Continuing with this example, the second conveyor unit 210 and the fourth conveyor unit 220 can hold at least a portion of the stem 120 (or other second portion 110) of the same item of produce 100 generally fixed in position.

In this example, the different components (e.g., pod 115, stem 120) of the produce 100 can be held in a their positions during conveyance through at least part of the de-stemming apparatus 200 by the conveyor belt 605 of the first conveyor unit 205, a conveyor belt 610 of the second conveyor unit 210, a conveying belt 615 of the third conveyor unit 215, and a conveying belt 620 of the fourth conveyor unit 220.

In one implementation, during engagement with the stem 120, the produce 100 is traveling in a first trajectory, e.g., the direction of motion 227. As motion continues, the produce 100 can pass the pivot point 270 between the first portion 250 and the second portion 275 of the second conveyor unit 210. When the produce 100 passes the pivot point 270, at least a portion of the stem 120 (or other second portion 110 of the produce 100) begins conveyance along a different second trajectory, e.g., the direction of motion 229. From the pivot point 270, the two trajectories can diverge from each other by between zero and 90 degrees. In one implementation, this divergence is between 10 and 45 degrees. A portion of the produce 100 can extend across the gap 305.

During continued conveyance through the de-stemming apparatus 200, the angular displacement between the trajectory of the portion of the pod 115 held in place by the first conveyor unit 205 and the third conveyor unit 215 (e.g., travelling in direction 227) and the portion of the stem 120 held in place by the second conveyor unit 210 and the fourth conveyor unit 220 (e.g., travelling in direction 229) generates a separation force between the stem 120 and the pod 115. In some implementations, the separation force peels at least some of the stem 120 and the calyx 125 (or other part of a second portion 110 of the produce 100) from the pod 115 (or other part of the first portion 105 of the produce 100).

With sufficient distance (e.g., between 0.5 and 24 inches) of continued conveyance of the produce 100 in diverging directions, at least part of the second portion 110 separates from the remainder of the produce 100. The distance the produce 100 travels between a first point where it is held in position (e.g., a point of initial engagement within the range 225, along the length of the first portion 250 of the second conveyor unit 210, or at or proximate to the pivot point 270) and a second point where separation is complete (e.g., within the range 230, along the length of the second portion 275 of the second conveyor unit 210, or downstream from the pivot point 270) varies with the angle, or degree of divergence, between the first and third conveyor units (travelling in a first direction) and the second and fourth conveyor units (travelling in a second direction). The angle can vary between zero and 90 degrees. In some implementations the separation occurs within 18 inches from the pivot point 270 where the pod 115 trajectory and the stem 120 trajectory begin to diverge.

Figure 7:
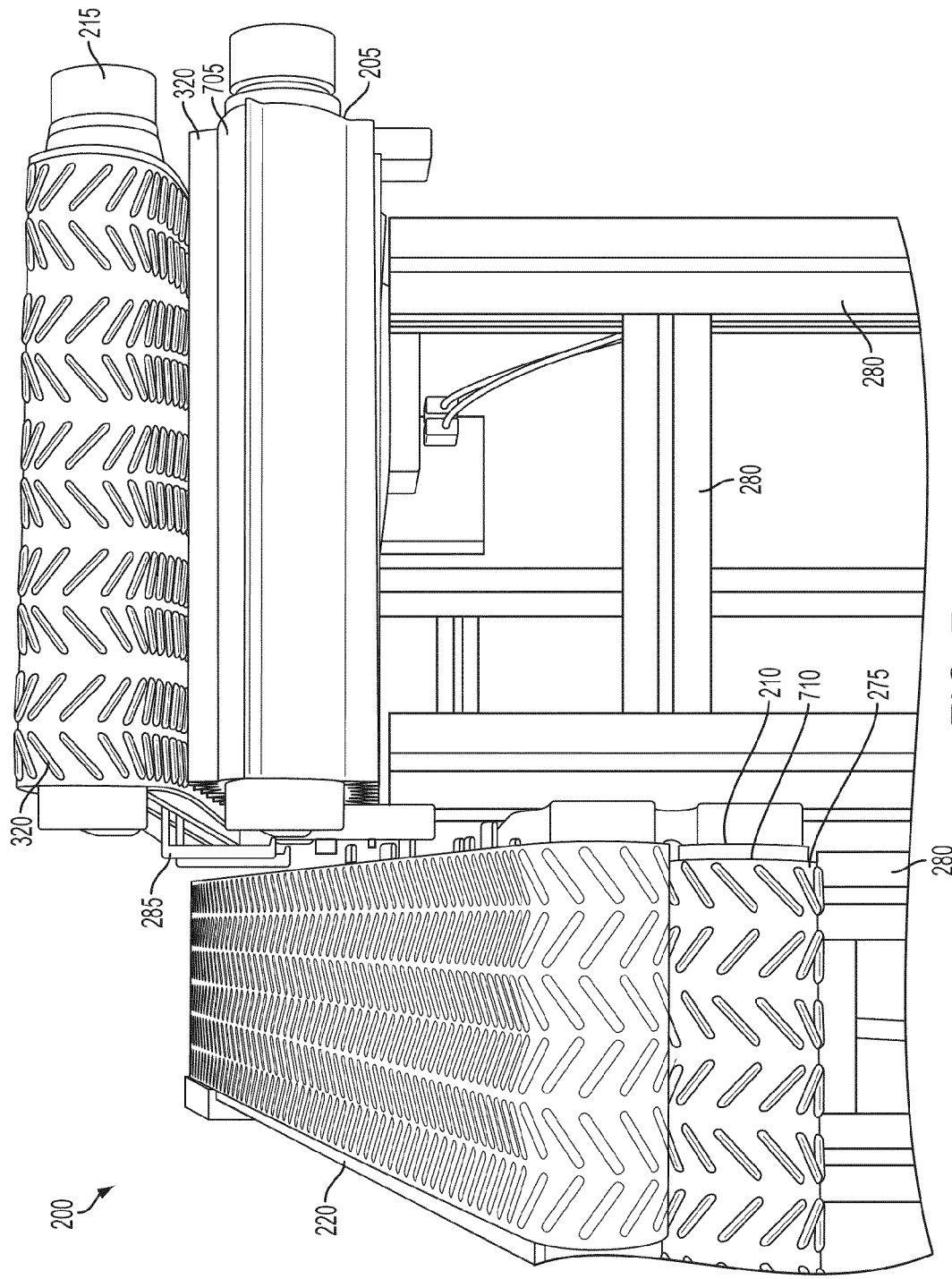
FIG. 7 is a perspective view depicting one example of a de-stemming apparatus, according to an illustrative implementation.

FIG. 7 illustrates one example of a de-stemming apparatus 200 from a rear perspective, for example where the produce 100 is expelled from the de-stemming apparatus 200. With reference to FIGS. 1-7, the first conveyor unit 205 and the third conveyor unit 215 can convey the first portion 105 of the produce 100 (e.g., the pod 115) in a first trajectory (e.g., the direction of motion 227), and the second portion 275 of the second conveyor unit 210 and the fourth conveyor unit 220 convey can convey the produce 100 in a second trajectory (e.g., the direction of motion 229). Conveyance in these diverging paths can generate a separation force between at least a portion of the stem 120 and the remainder of the produce 100. The separation force can separate or peel (e.g., in a peeling motion or manner) at least a portion of the stem 120 apart from the remainder of the produce 100. For example, the stem 120 and the calyx 125 can be separated from the pod 115.

In some implementations, the first portion 105 of the produce 100 can be expelled from the de-stemming apparatus 200 due for example to gravitational forces when the first portion 105 is conveyed by at least the first conveyor unit 205 beyond the end portion 705 of the first conveyor unit 205. For example, the pod 115 can fall into a box or onto another conveyor unit for further processing, quality assessment, cleaning, or distribution. In some implementations, rather then falling from the end portion 705, the first conveyor unit of another conveyor unit or apparatus can continue to transport or carry the first portion 105 for further processing, quality assessment, cleaning, or distribution. In one implementation, a worker can manually remove the first portion 105 from the de-stemming apparatus 200 subsequent to separation of at least part of the second portion 110 from the first portion 105.

The second portion 110 or portion thereof can be expelled from the de-stemming apparatus 200 due to conveyance beyond the edge 710 of the second conveyor unit 210. For example, at least a portion of the stem 120 or the calyx 125 can fall into a box for onto another conveyor unit, or can continue to be conveyed by at least the conveyor unit 210 for further processing, recycling, or disposal.

Figure 8:
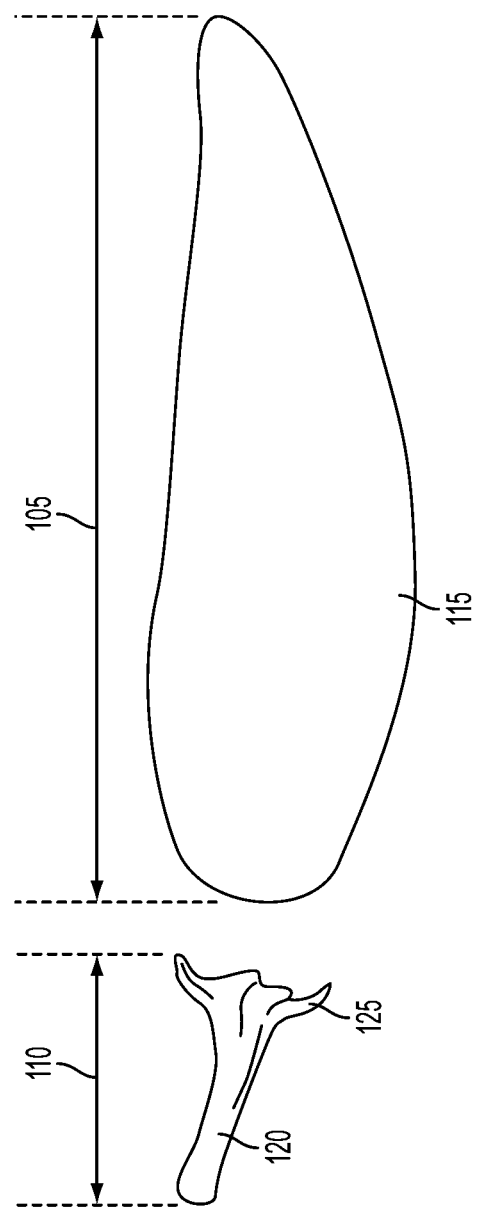
FIG. 8 is an illustration depicting one example of an item of produce, according to an illustrative implementation.

FIG. 8 illustrates one example of the produce 100 subsequent to separation of the second portion 110 from the first portion 105 by the de-stemming apparatus 200. In one implementation, the de-stemming apparatus 200 separates at least part of the second portion 110 from the remainder of the produce 100. For example, all or part of the stem 120 and the calyx 125 can be separated from the body or pod 115. In some implementations, the pod 115 remains substantially intact after separation from the stem 120 or calyx 125. For example, due to the peeling motion the pod 115 (or other first portion 105 of an item of produce 100) can be substantially free of punctures, tears, penetrations, or cut marks. In one implementation, the peeling motion that occurs due to the separation force causes separation between the calyx 125 and the pod 115. In some implementations, the separation force causes separation between at least part of the stem 115 and the remainder of the produce 100. In one implementation the produce 100 may have a minimal or no calyx 125, and the separation can occur between the stem 120 and the pod 115.

In some implementations, each of the first to fourth conveyor units 205-220 (e.g., all four) can be in simultaneous motion. The conveyor units 205-220 can be driven by the same or different driving units 235, and one driving unit 235 can drive one or more of conveyor units 235 at the same speed (e.g., within +/−10%). In one implementation, one driving unit 235 drives each of the four conveyor units 205-220. In some implementations, the four conveyor units 205-220 are different parts of one conveyor unit. For example, the de-stemming apparatus 200 can have more or less than four conveyor belts or more or less than four conveyor units. One conveyor belt can convey the produce 100 along more than one conveyor unit. In one implementation, at least one of the conveyor units 205-220 can be passive, e.g., not actively driven by the driving unit 235. For example, the third conveyor unit 215 or the fourth conveyor unit 220 can include bearings that are not driven by any of the driving units 235 that can rotate or spin to allow at least a portion of the produce 100 to pass.

In some implementations, the produce 100 can be fed into the de-stemming apparatus 200 at, or proximate to, the pivot point 270. In this example, the produce 100 enters the de-stemming apparatus 200 in a fixed or substantially fixed position with the produce engaged on multiple sides (e.g., on the bottom by the first conveyor unit 205 or the second conveyor unit 210) and on the top (e.g., by the third conveyor unit 215 or the fourth conveyor unit 220). In one implementation, the produce 100 can be initially conveyed with only bottom support for the produce 100 and with the produce 100 being in a loose or non-fixed position prior to engagement, proximate, or prior to the pivot point 270.

The de-stemming apparatus 200 can de-stem produce 100 in a low or high volume environment. For example, the de-stemming apparatus 200 can be part of a volume production plant in an assembly line type environment where a high volume of produce 100 (e.g., between 500 and 2500 pounds of produce per hour) is de-stemmed by the de-stemming apparatus 200. The de-stemming apparatus 200 can also be a portable or semi-portable unit that can be set up outside a factory or mass production environment, such as outside in a field or farm sufficiently close to a crop so that a harvester (or harvesting machine) can pick the produce 100 and feed the produce 100 to the de-stemming apparatus, e.g., by placing the first portion 105 of the produce 100 on the top surface 245 of the first conveyor unit 205. The de-stemming apparatus 200 can process multiple items of produce 100 simultaneously, with different items of produce 100 in different stages of the de-stemming process during sequential conveyance through the de-stemming apparatus 200.

Figure 9:
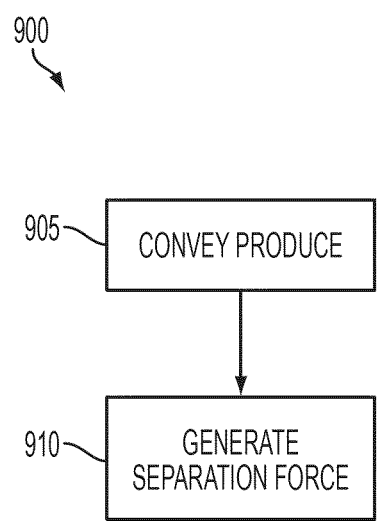
FIG. 9 is a flow diagram illustrating a method of processing produce, according to an illustrative implementation.

FIG. 9 illustrates a flow diagram illustrating a method 900 of processing produce, according to an illustrative implementation. The method 900 includes at least one act of conveying produce (ACT 905). In some implementations the produce is conveyed (ACT 905) through a de-stemming apparatus from a first point to or through a second point. The method 900 can convey, for example using the de-stemming apparatus, produce having a first portion (e.g. a pod) and a second portion (e.g., a stem) at a constant speed. During conveyance (ACT 905) between the first point and the second point, the first portion of the produce can be fixed in a first trajectory. For example, at least part of the first portion of the produce can be held in place by one or more conveyor units. The second portion of the produce can be fixed in a second trajectory during conveyance (ACT 905) between the first and second points. In some implementations, the second trajectory can deviate from the first trajectory be an angle of between greater than zero and less than 90 degrees. For example, the deviation can be greater than zero and less than 45 degrees, or less than 25 degrees. In one implementation, the produce can be conveyed (ACT 905) between the first and second points at a constant speed (e.g., +/−10%). The first and second trajectories can be linear.

The method 900 can include at least one act of generating a separation force (ACT 910). The separation force can be applied between the first portion and second portions of the produce. For example, the separation force can be applied to the stem or pod of the produce to separate at least a portion of the stem from the remainder of the produce (e.g., from the pod).

In one implementation, the method 900 generates the separation force (ACT 910) by conveying the pod in a first trajectory and by conveying the stem in a second trajectory that deviates from the first trajectory. For example, the pod (or other first portion of produce) can be conveyed in the first trajectory by at least a first conveyor unit, and the stem (or other second portion of produce) can be conveyed in the second trajectory by at least a second conveyor unit. At least one driving unit can drive the first and second conveyor units at the same or substantially the same speed, (e.g., within 10%) during conveyance in the different trajectories, such as between a first point (e.g., the pivot point) and a second point where there the separation is complete.

The operations described in this specification can be implemented as operations performed by a data processing apparatus on data stored on one or more computer-readable storage devices or received from other sources. For example, the driving unit 235 can include control circuitry (e.g., at least one processor or application specific integrated circuit) that operates the driving unit to move at least one of the first to fourth conveyor units 205 to 220.

Features that are described herein in the context of separate implementations can also be implemented in combination in a single embodiment or implementation. Features that are described in the context of a single implementation can also be implemented in multiple implementations separately or in various sub-combinations. Moreover, although features may be described above as acting in certain combinations and even initially claimed as such, one or more features from a claimed combination can in some cases be excised from the combination, and the claimed combination may be directed to a sub combination or variation of a sub combination.

Similarly, any acts depicted in the drawings should not be understood as requiring performance in the particular order shown or in sequential order, or that all illustrated acts be performed, to achieve desirable results. Actions recited in the claims can be performed in a different order and still achieve desirable results. In addition, the processes depicted in the accompanying figures do not necessarily require the particular order shown, or sequential order, to achieve desirable results.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, specific references to a pod can include generic references to any first or generally edible portions of produce, and specific references to any stem or calyx include generic references to any second or generally uneaten portions of produce. Generic references to a first portion of produce include references to generally edible portions such as a pod or body, and generic references to a second portion of produce include references to generally uneaten portions such as a stem or calyx. Further, while not labeled in every Figure for clarity and ease of description, elements present and labeled in one Figure may be present and unlabeled in other Figures. For example, at least some of the conveyor belts 605, 610, 615, 620 labeled in FIG. 6 are present in other Figures, e.g., FIGS. 2-7. Further, while referred to as a de-stemming apparatus, the de-stemming apparatus 200 can remove portions of items of produce other than stems, such as leaves, branches, or other support structures or appendages of an item of produce.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A de-stemming apparatus for de-stemming produce having a pod, a stem, and a calyx, comprising:
    a first conveyor unit having a top surface configured to convey the pod;
    a second conveyor unit having a first portion proximate to the first conveyor unit and having a second portion disposed at an angle of greater than zero and less than 60 degrees relative to the first conveyor unit, a first portion of the first conveyor unit in parallel with the first portion of the second conveyor unit to define a gap between the first portion of the first conveyor unit and the first portion of the second conveyor unit;
    the first portion of the second conveyor unit and the second portion of the second conveyor unit defining a pivot point;
    a third conveyor unit arranged with the top surface of the first conveyor unit in parallel with a bottom surface of the third conveyor unit to define an opening to engage the pod between the top surface of the first conveyor unit and the bottom surface of the third conveyor unit; and
    at least one driving unit configured to drive at least one of the first conveyor unit, the second conveyor unit, and the third conveyor unit to convey the produce from a first point of the de-stemming apparatus past the pivot point to a second point of the de-stemming apparatus with the pod engaged in the opening between the top surface of the first conveyor unit and the bottom surface of the third conveyor unit, and with the stem engaged by the second portion of the second conveyor unit, the at least one driving unit further configured to generate a separation force between the pod and the stem to separate at least a portion of the stem and at least a portion of the calyx from the pod during conveyance of the produce between the first point and the second point with the pod engaged in the opening between the top surface of the first conveyor unit and the bottom surface of the third conveyor unit, and with the stem engaged by the second portion of the second conveyor unit.

2. The apparatus of claim 1, further comprising:
    a fourth conveyor unit;
    the top surface of the first conveyor unit and the bottom surface of the third conveyor unit configured to hold at least a portion of the pod in a fixed position during conveyance between the first point and the second point; and
    the top surface of the second conveyor unit and the bottom surface of the fourth conveyor unit configured to hold at least a portion of the stem in a fixed position during conveyance between the first point and the second point.

3. The apparatus of claim 1, further comprising:
    a fourth conveyor unit configured to engage the stem with the second conveyor unit;
    at least a portion of the third conveyor unit disposed parallel to at least a portion of the first conveyor unit; and
    at least a portion of the fourth conveyor unit disposed parallel to at least a portion of the second portion of the second conveyor unit.

4. The apparatus of claim 1, wherein the separation force between the pod and the stem separates the stem and the calyx from the pod at an area of the produce between the calyx and the pod with the stem attached to the calyx.

5. The apparatus of claim 1, wherein the produce moves at a constant speed with at least the first conveyor unit and the second conveyor unit between the first point and the second point.

6. The apparatus of claim 1, further comprising:
    the at least one driving unit configured to convey the produce from the first point to the second point to separate the stem and the calyx from the pod between the first point and the second point in the absence of a cutting blade disposed between the first point and the second point and in the absence of a separation obstacle configured to contact the produce and disposed between the first point and the second point.

7. The apparatus of claim 1, further comprising:
    an aligning unit configured to align the produce with at least a portion of the pod disposed on the top surface of the first conveyor unit and with at least a portion of the stem disposed on or above the second conveyor unit.

8. The apparatus of claim 1, wherein the first conveyor unit and the third conveyor unit are configured to apply a compression force to at least a portion of the pod.

9. The apparatus of claim 1, wherein the second portion of the second conveyor unit and a fourth conveyor unit are configured to apply a compression force to at least a portion of the stem.

10. The apparatus of claim 1, wherein the angle is less than 25 degrees.

11. The apparatus of claim 1, further comprising:
a shaft coupled with the at least one driving unit, the first conveyor unit and the second conveyor unit, the shaft and the at least one driving unit configured to operate the first conveyor unit and the second conveyor unit at a same speed.

12. The apparatus of claim 1, further comprising:
a shaft coupled with the at least one driving unit, the third conveyor unit and a fourth conveyor unit, the shaft and the at least one driving unit configured to operate the third conveyor unit and the fourth conveyor unit at a same speed.

13. The apparatus of claim 1, further comprising:
a mounting structure configured to support at least one of the first conveyor unit, the second conveyor unit, and the third conveyor unit.

14. The apparatus of claim 1, further comprising at least one of:
a bracket connected to the first conveyor unit and configured to support the third conveyor unit; and
a bracket connected to the second conveyor unit and configured to support a fourth conveyor unit.

15. The apparatus of claim 1, wherein the first conveyor unit has a width of less than 10 inches and a length of greater than 10 inches, and wherein the second conveyor unit has a width of less than 6 inches.

16. The apparatus of claim 1, wherein the opening is a first opening, further comprising:
the top surface of the first conveyor unit and the bottom surface of the third conveyor unit configured to define the first opening having a height of less than three inches between the top surface of the first conveyor unit and the bottom surface of the third conveyor unit; and
the top surface of the second conveyor unit and the bottom surface of a fourth conveyor unit configured to define a second opening having a height of less than 0.25 inches between the top surface of the second conveyor unit and the bottom surface of the fourth conveyor unit.

17. The apparatus of claim 1, wherein a combined longitudinal length of the first portion of the second conveyor unit and the second portion of the second conveyor unit is less than a longitudinal length of the first conveyor unit.

18. An apparatus for processing an item of produce having a first portion and a second portion attached to the first portion, comprising:
at least one first conveyor unit, at least one second conveyor unit, and at least one third conveyor unit;
the at least one first conveyor unit having a top surface in parallel with a bottom surface of the at least one third conveyor unit to define an opening to engage the first portion of the item of produce between the top surface of the at least one first conveyor unit and the bottom surface of the at least one third conveyor unit to convey the first portion of the item of produce in a first linear direction,
a first portion of the at least one second conveyor unit and a second portion of the at least one second conveyor unit defining a pivot point; and
the at least one second conveyor unit configured to convey the second portion of the item of produce in a second linear direction that differs from the first linear direction by less than 45 degrees to generate a separation force between the first portion of the item of produce and the second portion of the item of produce, with the first portion of the item of produce engaged in the opening, to separate the first portion from the second portion, the first portion of the at least one second conveyor unit in parallel with a first portion of the at least one first conveyor unit to define a gap between the first portion of the at least one first conveyor unit and the first portion of the at least one second conveyor unit.

19. The apparatus of claim 18, further comprising:
the at least one first conveyor unit configured to convey the first portion of the item of produce in a first fixed position in the first linear direction; and
the at least one second conveyor unit configured to convey the second portion of the item of produce in a second fixed position in the second linear direction.

20. An apparatus for processing produce, comprising:
means for conveying produce having a pod and a stem from a first point past a pivot point to a second point with the pod fixed in a first trajectory and the stem fixed in a second trajectory that deviates from the first trajectory by an angle greater than zero and less than 45 degrees to generate a separation force between the pod and the stem that separates at least a portion of the stem from the pod during conveyance from the first point through the second point,
the means for conveying the produce comprising:
a first conveyor unit, a second conveyor unit, and a third conveyor unit;
the first conveyor unit having a first portion in parallel with a first portion of the second conveyor unit to define a gap between the first portion of the first conveyor unit and the first portion of the second conveyor unit;
the first portion of the second conveyor unit and a second portion of the second conveyor unit arranged to define the pivot point; and
a top surface of the first conveyor unit in parallel with a bottom surface of the third conveyor unit to define an opening to engage the pod between the top surface of the first conveyor unit and the bottom surface of the third conveyor unit.

21. The apparatus of claim 1, wherein a width of the gap is between 0.25 inches and 3 inches.

22. The apparatus of claim 1, wherein a width of the gap is less than a length of the stem.

* * * * *